United States Patent
Xu et al.

(10) Patent No.: US 12,380,241 B2
(45) Date of Patent: Aug. 5, 2025

(54) SCANNING AND MASKING DATA AT A SOURCE DEVICE

(71) Applicant: Capital One Services, LLC, McLean, VA (US)

(72) Inventors: Tao Xu, Clarksburg, MD (US); Nesreen Mansour, Great Falls, VA (US); Joseph Robert Sacchini, Reston, VA (US)

(73) Assignee: Capital One Services, LLC, McLean, VA (US)

( * ) Notice: Subject to any disclaimer, the term of this patent is extended or adjusted under 35 U.S.C. 154(b) by 536 days.

(21) Appl. No.: 17/230,540

(22) Filed: Apr. 14, 2021

(65) Prior Publication Data
US 2022/0335158 A1    Oct. 20, 2022

(51) Int. Cl.
*G06F 21/62* (2013.01)
*G06N 20/00* (2019.01)

(52) U.S. Cl.
CPC ...... *G06F 21/6254* (2013.01); *G06F 21/6227* (2013.01); *G06N 20/00* (2019.01)

(58) Field of Classification Search
CPC ............. G06F 21/6254; G06F 21/6227; G06F 21/6245; G06N 20/00
See application file for complete search history.

(56) References Cited

U.S. PATENT DOCUMENTS

| | | | |
|---|---|---|---|
| 2009/0282036 A1* | 11/2009 | Fedtke | G06F 21/6254 707/E17.135 |
| 2020/0311304 A1* | 10/2020 | Parthasarathy | G06F 11/3006 |
| 2021/0011807 A1* | 1/2021 | Rosenthal | G06F 11/1469 |

* cited by examiner

*Primary Examiner* — Huan V Doan
(74) *Attorney, Agent, or Firm* — Harrity & Harrity, LLP

(57) ABSTRACT

In some implementations, an application server may receive an indication of one or more masking rules for identifying sensitive data at the application server. The application server may generate data that includes information associated with an application of the application server, where the data is associated with one or more destination devices. The application server may process the data based on the one or more masking rules to identify sensitive data included in the data, where processing the data includes masking any sensitive data included in the data to obtain masked data. The application server may generate output data that includes the data and the masked data in a first data format associated with a first destination device of the one or more destination devices. The application server may transmit, to the first destination device, the output data in the first data format.

20 Claims, 6 Drawing Sheets

SCANNING AND MASKING DATA AT A SOURCE DEVICE

BACKGROUND

Data masking or data obfuscation is the process of hiding original data with modified content, such as symbols, characters, and/or other data. Data masking may be used to protect data that is classified as personally identifiable information, sensitive personal data, and/or commercially sensitive data, among other examples. Data masking may modify the original data (e.g., to protect or hide sensitive data) while maintaining a format or appearance of the data to ensure that the data remains useful.

SUMMARY

In some implementations, a source device for scanning and masking data at the source device includes one or more memories and one or more processors, communicatively coupled to the one or more memories, configured to: receive a masking configuration that indicates one or more masking rules for scanning data for sensitive information; generate log data that includes information associated with an application of the source device, wherein the log data is associated with one or more destination devices; scan the log data for sensitive information based on the one or more masking rules, wherein scanning the log data enables the source device to identify sensitive information included in the log data; modify the log data to remove sensitive information from the log data and to generate first masked log data if the sensitive information is identified in the log data based on scanning the log data, wherein modifying the log data includes replacing the sensitive information in the log data with a mask string; and transmit, to a first destination device of the one or more destination devices, the first masked log data, wherein transmitting the first masked log data includes transmitting the first masked log data in a first data format associated with the first destination device.

In some implementations, a method of scanning and masking data at an application server includes receiving, by the application server, an indication of one or more masking rules for identifying sensitive data at the application server; generating, by the application server, data that includes information associated with an application of the application server, wherein the data is associated with one or more destination devices; processing, by the application server, the data based on the one or more masking rules to identify sensitive data included in the data, wherein processing the data includes masking any sensitive data included in the data to obtain masked data; generating, by the application server, output data that includes the data and the masked data, wherein generating the output data includes generating the output data in a first data format associated with a first destination device of the one or more destination devices; and transmitting, by the application server and to the first destination device, the output data in the first data format.

In some implementations, a non-transitory computer-readable medium storing a set of instructions includes one or more instructions that, when executed by one or more processors of a source device, cause the source device to: receive a masking configuration that indicates one or more masking rules for scanning data for sensitive information; generate log data that includes information associated with an application of the source device, wherein the log data is associated with one or more destination devices; scan the log data for sensitive information based on the one or more masking rules, wherein scanning the log data enables the source device to identify sensitive information included in the log data; modify the log data to remove sensitive information from the log data and to generate first masked log data if the sensitive information is identified in the log data based on scanning the log data, wherein modifying the log data includes replacing the sensitive information in the log data with a mask string; and transmit, to a first destination device of the one or more destination devices, the first masked log data, wherein transmitting the first masked log data includes transmitting the first masked log data in a first data format associated with the first destination device.

DETAILED DESCRIPTION

Figure 1A:
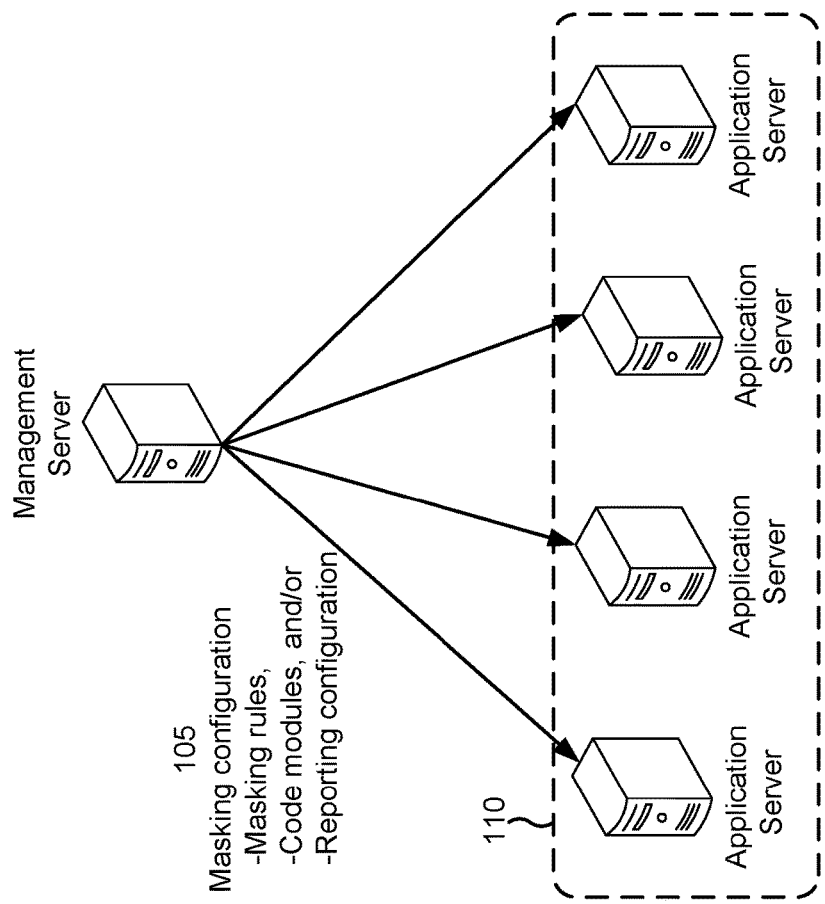
FIGS. 1A-1C are diagrams of an example implementation relating to scanning and masking data at a source device.

The following detailed description of example implementations refers to the accompanying drawings. The same reference numbers in different drawings may identify the same or similar elements.

A device may execute one or more processes and/or one or more applications to enable the device to perform actions. In some cases, a process and/or application executed by the device may generate data associated with the actions performed by the device. As used herein, a device that generates data may be referred to as a source device and/or an application server. In some cases, a source device (and/or an application executing on the device) may generate a log associated with an action or operation performed by the source device. A log may include data associated with events that have occurred associated with an application executing on the source device. For example, a log may identify one or more scripts, queries, operations, jobs, and/or other information designed to provide information regarding the status of data processing jobs. In some cases, the source device may transmit log data to another device (e.g., a destination device) to enable the other device to analyze, store, and/or compile log data from multiple source devices.

However, in some cases, the source device may generate log data that includes sensitive information. "Sensitive information" may refer to information that is confidential, secret, personal, and/or otherwise protected. The source device may not detect that the log data includes sensitive information and may share the log data with a destination device. As a result, the source device may inadvertently make an unauthorized disclosure of the sensitive information (e.g., that is identified in the log data) by transmitting the log data to the destination device that is outside of an environment associated with the source device and/or that is associated with a different entity than an entity associated with the source device. Such unauthorized disclosures of sensitive information may result in legal liability and/or financial liability for the entity associated with the source device.

In some cases, the entity associated with the source device may attempt to scan and mask sensitive information identified in log data. For example, a centralized architecture for scanning and masking sensitive information may be used. The centralized architecture may include a source device (or a group of source devices) transmitting data (e.g., log data) to a central server device (or a group of central server devices) that perform scanning and masking of sensitive information at the central server device. The central server device may identify sensitive information in the log data, may mask the identified sensitive information (e.g., by removing or modifying the sensitive information), and may transmit the masked log data to a final destination. However, the centralized architecture requires that the source device transmit log data (e.g., that may include sensitive information) to the central server device (e.g., over a network). Transmitting the log data to the central server device introduces a risk that log data that identifies sensitive information may be disclosed (e.g., as the log data may be intercepted by a malicious actor and/or may be transmitted to a device outside of the environment associated with the source device). Moreover, the centralized architecture is unable to process large amounts of data. For example, the source device (or group of source devices) may execute applications or programs that generate hundreds, thousands, or millions of logs daily. As the centralized architecture may include a central server device that receives log data from multiple source devices, the central server device may be unable to process (e.g., scan and mask) the large amounts of log data generated by the multiple source devices. As a result, the centralized architecture may be unable to be used with large data inputs, such as where multiple source devices generate hundreds, thousands, or millions of logs daily.

In some cases, a source device may perform scanning and masking of data at the source device using a program or application executing on the source device. For example, a data collection application may be associated with a destination device of log data generated by the source device. The data collection application may provide an application that scans and masks log data at the source device before the source device transmits the log data to the destination device associated with the data collection application. However, if the source device is associated with another destination device, then the application that scans and masks log data at the source device may be unable to scan and mask data that is to be transmitted to the other destination device. For example, a configuration (e.g., a data format, an encryption technique, and/or another parameter used to receive, scan, mask, and/or transmit log data) that is used by the application may be specific to the destination device associated with the application. As a result, if the source device is required to transmit log data to multiple destination devices, the application that scans and masks log data at the source device may not be compatible with other destination devices as the other destination devices may be associated with different configurations. Therefore, the application that scans and masks log data at the source device may not be able to scan and mask log data that is to be transmitted to the other destination devices. As a result, the source device may be required to transmit log data that identifies sensitive information outside of the source device (e.g., introducing a risk of an unauthorized disclosure of the sensitive information) and/or may be required to execute multiple applications at the source device for scanning and masking data (e.g., increasing a complexity associated with scanning and masking data at the source device and consuming significant computing resources and/or network resources of the source device).

Some techniques and implementations described herein enable scanning and masking of data at the source device. For example, some techniques and implementations described herein may address the problems described above associated with scanning and masking sensitive data. In some implementations, a management server (e.g., a management device) may transmit a masking configuration to multiple application servers (e.g., source devices). The masking configuration may indicate one or more masking rules for scanning data for sensitive information, one or more code modules (e.g., associated with an application executing on the application server and/or a destination device), and/or a reporting configuration for reporting instances of identified sensitive information, among other examples. This may enable a federated architecture for scanning and masking data where each application server (e.g., each source device) locally performs (e.g., at the application server) scanning and masking of data generated by the application server. By federating the task of scanning and masking to each application server, scaling issues to large amounts of data are mitigated. For example, as described above, a centralized architecture may be unable to process the large amount of data produced by application servers. However, the federated architecture enables each application server to perform the task(s) associated with scanning and masking sensitive information identified in data generated at the source device. As a result, as the scanning and masking is performed locally, the federated architecture can scale to any size and can enable scanning and masking of large amounts of data without overloading a central server device. Moreover, the federated architecture improves reliability of the scanning and masking operations as there is no risk of the central server device being unavailable or experiencing failures associated with the scanning and masking operations (e.g., as scanning and masking operations are performed locally at the application server, the federated architecture does not rely on a central server device being available for performing the scanning and masking operations).

Additionally, techniques and implementations described herein improve security of data generated by an application server. For example, because the scanning and masking of sensitive information is performed at the application server (e.g., before the data leaves the application server), a risk of a disclosure of the sensitive information is reduced. For example, the data generated by the application server is not required to be transmitted outside of the application server (e.g., to a central server device) before the data is scanned for sensitive information and/or masked. As a result, a risk of the sensitive information being transmitted outside of the application server is mitigated because the application server is enabled to proactively scan and mask sensitive information in data generated by the application server before the data is transmitted outside of the application server. This improves security of the data generated by the application server by ensuring that sensitive information is not transmitted by the application (e.g., even to a device that is to perform scanning and/or masking operations). Therefore, techniques and implementations described herein ensure that sensitive information is never written to, or transmitted over, a network, thereby improving the security of the data generated by the application server.

Moreover, techniques and implementations described herein enable an application server to perform scanning and masking of data at the application server that is agnostic of an application and/or a destination device associated with the data. For example, the application server may be enabled to scan and/or mask data generated by the application server and transmit masked data to multiple destination devices. In some implementations, an application server may be executing multiple applications that collect data and transmit data to a destination device. The application server may be enabled to detect the multiple applications, identify data that is to be transmitted to a first destination device associated with a first application of the multiple applications, scan and/or mask the data, and transmit, to the first destination device, the masked data (e.g., in a data format or a configuration that is associated with the first application and/or the first destination device). Similarly, the application server may be enabled to identify data that is to be transmitted to a second destination device associated with a second application of the multiple applications, scan and/or mask the data, and transmit, to the second destination device, the masked data (e.g., in a data format or a configuration that is associated with the second application and/or the second destination device). In this way, the application server is enabled to scan and mask data for any destination device and/or for any application that collects data generated by the application server. This provides a more flexible approach for scanning and masking data at the application server. Moreover, this improves security of data generated by the application server by ensuring that the application server is enabled to scan and/or mask the data regardless of the destination of the data. Further, this reduces a complexity associated with scanning and masking data at the application server and conserves significant computing resources and/or network resources of the application server that would have otherwise been used to execute multiple applications (e.g., associated with multiple destination devices) on the application server for scanning and masking data that is to be transmitted to the multiple destination devices.

Figure 1B:
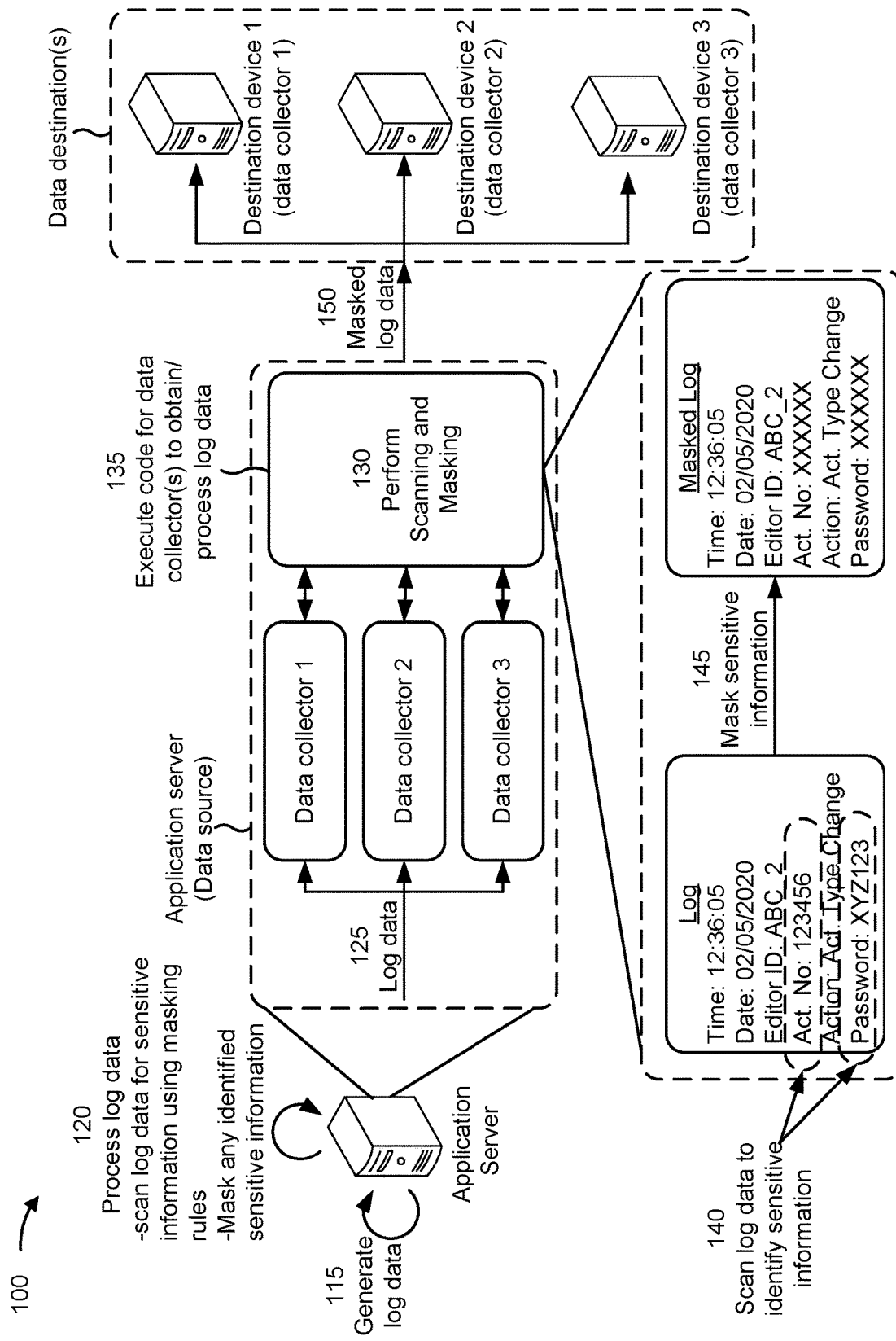
Figure 1C:
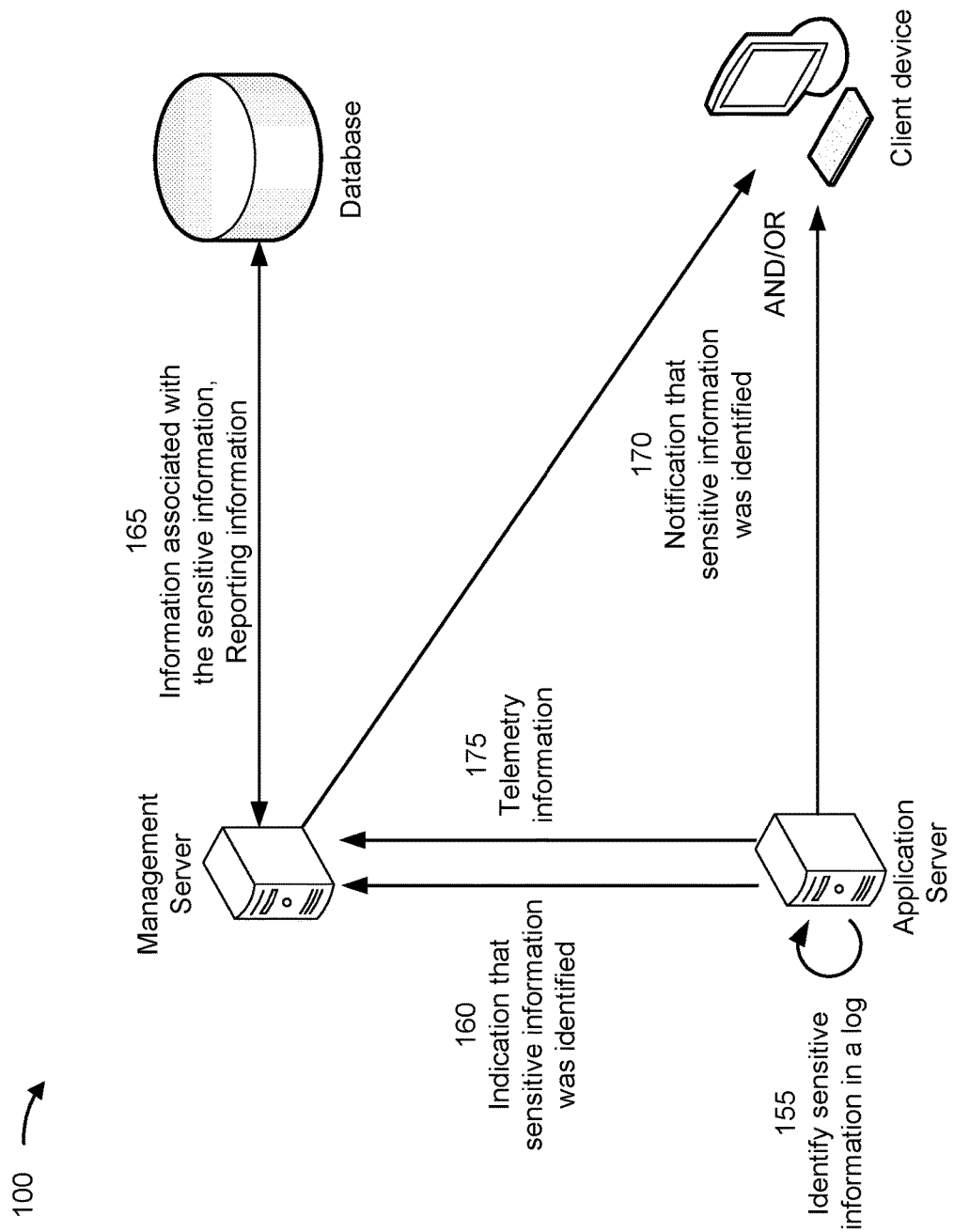

FIGS. 1A-1C are diagrams of an example 100 associated with scanning and masking data at a source device. As shown in FIGS. 1A-1C, example 100 includes one or more application servers (e.g., one or more source devices), a management server, one or more destination devices, a client device, and/or a database. These devices are described in more detail in connection with FIGS. 2 and 3.

As shown in FIG. 1A, and by reference number 105, the management server may transmit a masking configuration to one or more application servers. For example, as shown by reference number 110, the management server may be associated with a group of application servers. The management server may manage scanning and masking operations that are to be performed by each application server, as explained in more detail herein. In some implementations, an application server may download the masking configuration from the management server. For example, the application server may transmit, to the management server, a request for the masking configuration. The management server may transmit, to the application server, the masking configuration to be stored by and/or installed on the application server.

As shown in FIG. 1A, the masking configuration may indicate one or more masking rules. A masking rule may indicate a rule or set of parameters to be used by the application server to search data for sensitive information. As described above, sensitive information may refer to information that is confidential, secret, personal, and/or otherwise protected. For example, sensitive information may include personally identifiable information, a personal identification number (PIN), an account number, an account balance, a telephone number, a password, an address, a social security number, a bearer token, a security token, an encryption key, a card number (e.g., a credit card or debit card number), a security code, and/or a billing account number, among other examples. A masking rule may enable the application server to scan (e.g., search) data generated by the application server for sensitive information. For example, a masking rule may be a regular expression rule. A regular expression rule may be a sequence of characters that define a search pattern that can be used by the application server to identify sensitive information in data generated by the application server (e.g., in log data). For example, a regular expression rule may be written in a JavaScript Object Notation (JSON) format.

In some implementations, a masking rule may be in a form other than a regular expression rule. For example, a masking rule may be an artificial intelligence and/or machine learning based masking rule. In some implementations, a masking rule may include a regular expression rule and a function. For example, the masking rule may enable the application server to identify sensitive information in data (e.g., using the regular expression rule) and to validate that the identified sensitive information is valid (e.g., real) sensitive information (e.g., using the function). For example, a masking rule may enable the application server to identify a card number in data (e.g., in a log) generated by the application server. The masking rule may enable the application server to determine whether the identified card number is a valid card number (e.g., is a real card number and/or is an active card number). In some implementations, the application server may use a machine learning technique associated with a function of a masking rule. The use of masking rules that include a function may improve the ability of the application server to identify sensitive information. For example, some types of sensitive information may not be capable of being identified using a regular expression rule. By using a masking rule that includes a function, a broader masking rule can be defined that enables the application server to scan data more accurately for sensitive information. As a result, security of data generated by the application server is improved.

In some implementations, the masking configuration may indicate one or more sets of code. A set of code may be referred to as a code module. For example, an application server may be associated with one or more destination devices to which the application server is to transmit data. In some implementations, an application server may be associated with one or more applications executing on the application server that collect data generated by the application server (e.g., data collection applications). A code module may be associated with a destination device and/or a data collection application. The code module may identify code that enables the application server to intercept (e.g., identify) data that is to be collected by the application and/or that is to be transmitted to the destination device. The code module may enable the application server to scan the data for sensitive information and to mask any identified sensitive information (e.g., based on the one or more masking rules) to generate masked data. The code module may enable the application server to provide the masked data to the data collection application and/or to transmit the masked data to the destination device. The code module may enable the application server to generate and/or communicate the masked data using a configuration (e.g., a data format, an encryption process, and/or a data structure) associated with the destination device and/or the data collection application. As a result, the code modules may enable the application server to scan and/or mask data in different data formats or data structures and to transmit masked data (e.g., in different data formats or data structures) to different destination devices. This improves a flexibility of the scanning and masking operations. Additionally, this enables the application server to scan and mask data generated by the application server regardless of a configuration (e.g., a data format, an encryption process, and/or a data structure) and/or a destination associated with the data.

In some implementations, the masking configuration may indicate a reporting configuration for reporting instances of identified sensitive information. For example, an application server may be configured to report when the application server identifies sensitive information in data generated by the application server. For example, applications executing on the application server may be designed to not generate log data that includes sensitive information. Therefore, when the application server identifies sensitive information in log data, the instance of the identified sensitive information may be reported to enable a user or another device to investigate and/or identify an issue that resulted in the application generating log data that included sensitive information. For example, the reporting configuration may indicate a device or address that the application server is to transmit the notification of the identified sensitive information (e.g., the management server and/or a client device), and/or a content of the notification (e.g., whether the application server is to identify the log data, the sensitive information, masked log data, and/or an application associated with the log data), among other examples. This may enable a user or another device to investigate, identify, and/or correct issues that cause the application server to generate log data that included sensitive information. As a result, security of data generated by the application server may be improved because the issue that caused the application server to generate log data that included sensitive information can be identified and/or corrected.

As shown in FIG. 1A, by transmitting the masking configuration in the manner described above, a federated architecture for scanning and masking data locally at an application server can be enabled. For example, each application server (e.g., shown by reference number 110) may be enabled to perform scanning and masking at the application server in a proactive manner (e.g., before data generated by the application server leaves the application server), as described in more detail elsewhere herein. The federated architecture ensures that sensitive information included in data is masked (e.g., as described in more detail below) prior to the data being transmitted by the application server. This improves security of data generated by the application server by ensuring that sensitive information is not transmitted over a network to another device. Additionally, the federated architecture enables the scanning and masking solution to be scaled to any number of application servers or other source devices. For example, any number of application servers can be configured with the masking configuration without increasing a processing load on the management server. As a result, the federated architecture can be scaled horizontally (e.g., by adding additional application servers) to significantly increase an amount of data that can be scanned and masked using the federated architecture.

As shown in FIG. 1B, an application server may perform scanning and masking of data at the application server. For example, the application server shown in FIG. 1B may be an application server from the group of application servers shown by reference number 110 in FIG. 1A. Other application servers from the group of application servers may perform scanning and masking of data locally in a similar manner as described herein.

As shown by reference number 115, the application server may generate log data. For example, an application executing on the application server may perform one or more actions. The application may generate log data. As described above, log data may include data associated with events that have occurred associated with the application executing on the application server. For example, log data may identify one or more scripts, queries, operations, jobs, and/or other information designed to provide information regarding the status of data processing jobs.

As shown by reference number 120, the application server may process the log data generated by the application server. For example, processing the log data may include scanning the log data for sensitive information based on the one or more masking rules and/or masking any identified sensitive information. As described in more detail below, masking sensitive information may include modifying the log data to remove or change the sensitive information in the log data and to generate masked log data. For example, the sensitive information may be replaced with a mask string (e.g., one or more characters, one or more symbols, and/or one or more digits) in the log data.

For example, as shown by reference number 125, log data generated by the application server may be collected and/or received by one or more data collection applications executing on the application server. As shown in FIG. 1B, a first data collection application (e.g., data collector 1), a second data collection application (e.g., data collector 2), and a third data collection application (e.g., data collector 3) may be executing on the application server. As described above, each data collection application may be associated with an independent or separate configuration (e.g., data format and/or data structure) and/or an independent or separate process or procedure for collecting data generated by the application server.

The application server may perform scanning and masking of data (e.g., log data) generated by the application server. For example, as shown by reference number 130, the application server may perform scanning and masking of data associated with each data collection application. In some implementations, as shown by reference number 135, the application server may execute code for each data collection application to obtain and/or process the log data associated with each data collection application.

For example, as described above, the application server may be configured (e.g., in the masking configuration) with one or more sets of code or code modules. A code module may be associated with a data collection application. For example, the application server may be configured with a first code module for the first data collection application, a second code module for the second data collection application, a third code module for the third data collection application, and/or other code modules for other data collection applications (e.g., that are not currently executing on the application server). As described above, a code module may enable the application server to identify data to be collected by a data collection application, scan and/or mask the data in a data format or data structure associated with the data collection application, and transmit masked data (e.g., in the data format or data structure associated with the data collection application) to the data collection application and/or a destination device associated with the data collection application.

For example, the application server may detect that the first data collection application, the second data collection application, and the third data collection application are executing on the application server. The application server may identify the first code module, the second code module, and the third code module based on the masking configuration. The application server may execute the first code module, the second code module, and the third code module to enable the application server to scan and mask data for each data collection application that is currently executing on the application server. As different data collection applications are added or removed from the application server, the application server may change which code modules are executing on the application server. As a result, the application server is enabled to scan and mask data for any data collection application that is executing on the application server.

The application server may obtain log data that has been, or is to be, collected by a data collection application. As shown by reference number 140, the application server may scan (e.g., search) the log data to identify any sensitive information included in the log data based on the one or more masking rules (e.g., configured by the masking configuration). For example, as shown in FIG. 1B, a log may be generated by the application server that includes an account number (e.g., shown as "Act. No") of "123456" and a password of "XYZ123." The application server may identify that the log data includes the sensitive information (e.g., the entries for the account number and the password) based on scanning or searching the log data using the masking rules. The application server may identify a location of the sensitive information within the log data (e.g., in a data structure of the log data).

As shown by reference number 145, the application server may mask the identified sensitive information to remove, hide, and/or otherwise obfuscate the sensitive information in the log data to generate masked log data (e.g., a masked log). For example, the application server may mask the identified sensitive information by replacing the sensitive information with a mask string. As described above, a mask string may include one or more characters (e.g., "X," "O," and/or "A"), one or more symbols (e.g., "*," "-", ".," "@," "#," and/or "$") and/or one or more digits (e.g., "1," "0," and/or "9"), among other examples. In some implementations, the mask string may be a same number of characters as a number of characters of the sensitive information (e.g., an account number of 123456 may be replaced by a mask string of "XXXXXX") or a different number of characters as the number of characters of the sensitive information (e.g., an account number of 123456 may be replaced by a mask string of "###"). In some implementations, the application server may use one or more other data masking techniques, such as a substitution technique (e.g., where sensitive information is substituted with data fields that replicate authentic data), a shuffling technique (e.g., where sensitive information is randomly shuffled in the log data), a number and/or date variance technique (e.g., where numbers or dates are varied within a range to maintain meaningful information contained within the log data), an encryption technique (e.g., where sensitive information is replaced with an encrypted key), and/or a nulling out or deletion technique (e.g., where a field containing sensitive information is nulled or deleted), among other examples.

As shown in FIG. 1B, the masked log data may include the original log data with the sensitive information replaced by a mask string. In some implementations, the sensitive information may be masked by the application server in another manner, such as by deleting the sensitive information and/or replacing the sensitive information with other information that does not identify sensitive information (e.g., by replacing a name identified in log data with "John Doe" or by replacing an account number with "111111"). In this way, the application server may mask or otherwise hide sensitive information while also maintaining a data structure or format associated with the log data, thereby enabling the application server or another device (such as a destination device) to analyze the log data.

The application server may scan and mask log data for one or more (e.g., for each) data collection application in a similar manner as described above. For example, the application server may process (e.g., scan and/or mask) log data associated with the first data collection application (e.g., and/or a first destination device) based on the one or more masking rules to generate first masked log data in a first data format or first data structure. The application server may process (e.g., scan and/or mask) log data associated with the second data collection application (e.g., and/or a second destination device) based on the one or more masking rules to generate second masked log data in a second data format or second data structure.

As shown by reference number 150, the application server may transmit masked log data to one or more destination devices. "Masked log data" or "masked data" may refer to output data that is to be transmitted by the application server that has been scanned for sensitive information and/or has had any sensitive information masked or hidden, as described above. The application server may transmit masked log data to a first destination device (e.g., destination device 1 associated with the first data collection application), a second destination device (e.g., destination device 2 associated with the second data collection application), and a third destination device (e.g., destination device 3 associated with the third data collection application). The application server may generate masked log data to be transmitted to each destination device based on executing a code module associated with the corresponding destination device (and/or data collection application). For example, the application server may generate masked log data to be transmitted to the first destination device using a first data format or a first data structure based on executing a code module associated with the first destination device and/or the first data collection application. The application server may transmit, to the first destination device, the masked log data in the first data format or the first data structure and/or using one or more procedures (e.g., encryption procedures and/or transmission procedures) associated with the first destination device and/or the first data collection application.

Similarly, the application server may generate masked log data (e.g., masked output data) to be transmitted to the second destination device using a second data format or a second data structure based on executing a code module associated with the second destination device and/or the second data collection application. The application server may transmit, to the second destination device, the masked log data in the second data format or the second data structure and/or using one or more procedures (e.g., encryption procedures and/or transmission procedures) associated with the second destination device and/or the second data collection application. The application server may generate masked data for and/or transmit the masked data to the third destination device in a similar manner as described above (e.g., using a third data format and/or a third data structure).

As a result, the application server is enabled to scan data that is to be transmitted to multiple destination devices for sensitive information. The application server may generate masked output data (e.g., masked log data) in different data formats and/or in different data structures for different destination devices. Therefore, the application server may locally and proactively scan and mask data generated by the application server for any data collection application and/or for any destination device associated with the application server. This improves the security of the data generated by the application server by ensuring that sensitive information is not transmitted by the application server over a network (e.g., to a destination device and/or to a central server device, such as a central server device in a centralized architecture, as described above).

In some implementations, the application server may analyze the data (e.g., the log data) generated by the application server. For example, the application server may use a machine learning technique to identify at least one of sensitive information and/or to identify one or more patterns associated with the data, among other examples. In some implementations, the application server may analyze the data (e.g., the log data) generated by the application server to modify a masking rule and/or to generate a new masking rule (e.g., by identifying a trend or pattern in the data associated with sensitive information).

The application server may continually scan and mask data generated by the application server. For example, the application server may continue to perform the scanning and masking operations as described above (e.g., executing new code modules if new data collection applications are configured or are executed on the application server and/or terminating code module(s) if a data collection application is removed from or is no longer executing on the application server). This enables the application server to proactively scan all data generated by the application server for sensitive information before the data leaves the application server (e.g., before the data is transmitted by the application server). If the application server does not identify sensitive information in log data (e.g., based on scanning the log data using the masking rules), then the application server may transmit the log data to a destination device without modifying or masking the log data. However, if the application server does identify sensitive information in log data (e.g., based on scanning the log data using the masking rules), then the application server may modify the log data to remove or hide the sensitive information (e.g., by masking the log data as described above) to generate masked log data. The application server may transmit the masked log data to a destination device. Additionally, the application server may perform one or more actions based on identifying sensitive information in log data generated by the application server to enable an investigation and/or correction of an operation that caused the log data to be generated with sensitive information included in the log data.

As shown in FIG. 1C, and by reference number 155, the application server may identify sensitive information in a log generated by the application server (e.g., based on scanning the log using the masking rules, as described above). The application server may mask the log to remove, hide, and/or obfuscate the sensitive information and may transmit a masked log. In some implementations, the application server may perform one or more actions to notify another device and/or a user that sensitive information was identified in a log generated by the application server.

For example, as shown by reference number 160, the application server may transmit, to the management server, an indication that sensitive information was identified by the application server. The application server may transmit, to the management server, an indication of an instance of identified sensitive information. Additionally, the application server may transmit, to the management server, information to enable the management server and/or a user to identify the data that included the sensitive information and/or an application executing on the application server that generated the data that included the sensitive information. For example, the application server may transmit an indication of an identifier associated with the application server, an identifier associated with the application that generated the data that included the sensitive information, a date and/or time that the data was generated by the application server, a type of sensitive data that was identified (e.g., a masking rule that was used to identify the sensitive information), the masked data (e.g., with the sensitive information masked), and/or the data (e.g., including the sensitive information). As the management server may be associated with a same environment (e.g., a same entity) as the application server, it may be permissible for the application server to transmit the data (e.g., including the sensitive information) to the management server to enable the management server and/or a user to investigate and/or remedy the issue that caused the application server to generate data that included the sensitive information.

As shown by reference number 165, the management server may transmit, to the database, the information associated with the instance of identified sensitive information (e.g., that can be used to enable the management server and/or a user to identify the data that included the sensitive information and/or an application executing on the application server that generated the data that included the sensitive information). The database may store the information provided by the management server to enable the management server and/or another device (such as the client device) to access the information (and/or information associated with other instances of identified sensitive information) to analyze the information and identify an issue that caused the data to be generated with sensitive information. For example, the management server may store information associated with instances of identified sensitive information associated with multiple application servers (e.g., the group of application servers as described above in connection with FIG. 1A). The management server and/or another device may analyze the information (e.g., using a machine learning technique) to identify patterns or trends associated with the instances of identified sensitive information. This improves security of information generated by application servers because the management server (or another device) may be enabled to analyze instances of identified sensitive information across multiple application servers to identify and/or correct issues that cause data to be generated with sensitive information (e.g., while also maintaining the federated architecture that enables each application server to locally scan and mask data generated by the application server).

In some implementations, the management server may receive (e.g., obtain), from the database, reporting information associated with the instance of identified sensitive information. For example, the reporting information may indicate an address, a device, and/or a user that is to be notified if the application server identifies sensitive information. In some implementations, the reporting information may indicate an identifier and/or an address associated with the client device (e.g., indicating that the client device is to be notified if the application server identifies sensitive information).

As shown by reference number 170, the management server may transmit, to the client device, an indication (e.g., a notification) of the instance of identified sensitive information (e.g., indicating that the application server identified information and/or indicating information to enable the client device to identify the data that included the sensitive information and/or an application executing on the application server that generated the data). Additionally, or alternatively, the application server may transmit, to the client device, the indication of the instance of identified sensitive information. For example, the management server may transmit, to the application server, the reporting information. In some implementations, the application server may obtain the reporting information from the database. By notifying the client device of the instance of identified sensitive information, the client device (and/or a user associated with the client device) may be enabled to investigate, identify, and/or remedy an issue that caused the data to be generated with sensitive information. This improves security of data generated by the application server by enabling issues that cause data to be generated with sensitive information to be quickly identified and/or corrected.

In some implementations, as shown by reference number 175, the application server may transmit, to the management server telemetry information. "Telemetry information" may refer to information that enables the management server to monitor a use of the masking configuration(s) transmitted by the management server. The telemetry information may enable the management server to identify a number of application servers configured with the masking configuration, a version or type of the masking configuration configured on each application server, and/or to identify specific application servers configured with the masking configuration. For example, telemetry information may include an identifier associated with the application server, a version or type of masking configuration configured on the application server, an indication of one or more masking rules configured on the application server, and/or an identifier of a group or entity associated with the application server, among other examples. The management server may receive telemetry information for multiple application servers, such as the group of application servers described above in connection with FIG. 1A. As a result, the management server may be enabled to identify and analyze the number of application servers configured with the masking configuration, identify application servers configured with old or outdated masking configurations, and/or identify unauthorized application servers configured with the masking configuration, among other examples.

For example, the management server may identify that the application server is configured with an old or outdated masking configuration (e.g., based on the telemetry information transmitted by the application server). The management server may transmit, to the application server, a new or updated masking configuration (e.g., indicating one or more modified or new masking rules and/or one or more new or modified code modules). As a result, a feedback loop of telemetry information may be created to enable the management server to monitor and/or manage a usage of the masking configuration by multiple remote application servers. This improves a security of data generated by the application servers by ensuring that the application servers are configured with the most current or up to date masking configuration. Additionally, this enables the management server to analyze the usage of the masking configuration across multiple application servers to monitor and/or manage the usage of the masking configuration in the federated architecture.

As indicated above, FIGS. 1A-1C are provided as an example. Other examples may differ from what is described with regard to FIGS. 1A-1C.

Figure 2:
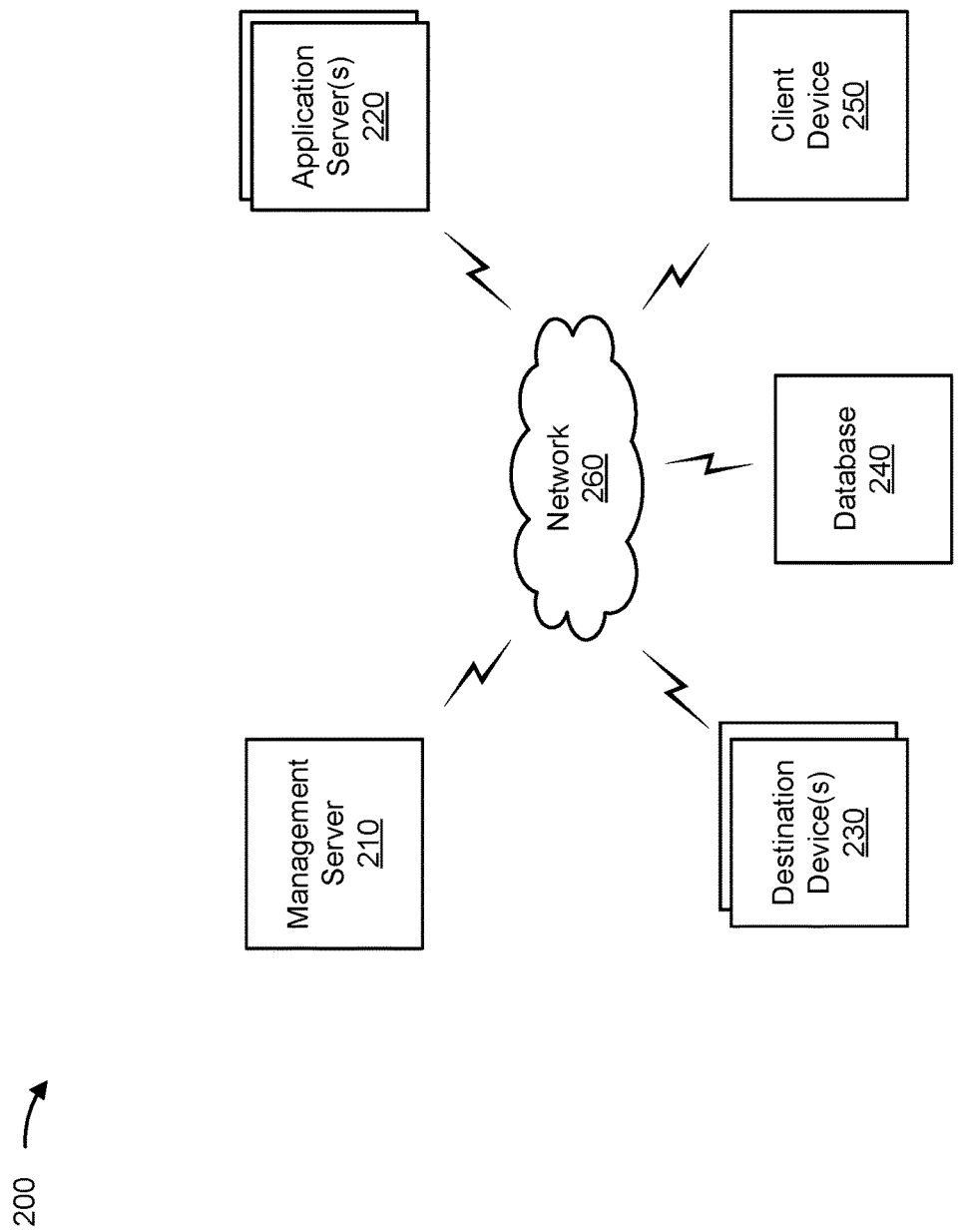
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a management server 210, one or more application servers 220, one or more destination devices 230, a database 240, a client device 250, and a network 260. Devices of environment 200 may interconnect via wired connections, wireless connections, or a combination of wired and wireless connections.

The management server 210 includes one or more devices capable of receiving, generating, storing, processing, providing, and/or routing information associated with managing and/or configuring scanning and masking data at a source device (e.g., at an application server 220), as described elsewhere herein. The management server 210 may include a communication device and/or a computing device. For example, the management server 210 may include a server, such as an application server, a client server, a web server, a database server, a host server, a proxy server, a virtual server (e.g., executing on computing hardware), or a server in a cloud computing system. In some implementations, the management server 210 includes computing hardware used in a cloud computing environment.

An application server 220 includes one or more devices capable of receiving, generating, storing, processing, providing, and/or routing information associated with scanning and masking data at a source device (e.g., at the application server 220), as described elsewhere herein. The application server 220 may include a communication device and/or a computing device. For example, the application server 220 may include a server, a client server, a web server, a database server, a host server, a proxy server, a virtual server (e.g., executing on computing hardware), or a server in a cloud computing system. In some implementations, the application server 220 includes computing hardware used in a cloud computing environment. In some implementations, the application server 220 may include a wireless communication device, a mobile phone, a user equipment, a laptop computer, a tablet computer, and/or a desktop computer, among other examples.

A destination device 230 includes one or more devices capable of receiving, generating, storing, processing, and/or providing information associated with scanning and masking data at a source device, as described elsewhere herein. For example, the destination device 230 may receive data (e.g., from an application server 220) that has been scanned and/or masked at the application server 220, as described elsewhere herein. The destination device 230 may include a communication device and/or a computing device. For example, the destination device 230 may include a wireless communication device, a mobile phone, a user equipment, a laptop computer, a tablet computer, a desktop computer, a server, a client server, a web server, a database server, a host server, a proxy server, a virtual server (e.g., executing on computing hardware), or a server in a cloud computing system, and/or a similar type of device.

The database 240 includes one or more devices capable of receiving, generating, storing, processing, and/or providing information associated with scanning and masking data at a source device, as described elsewhere herein. The database 240 may include a communication device and/or a computing device. For example, the database 240 may include a server, a database server, an application server, a client server, a web server, a host server, a proxy server, a virtual server (e.g., executing on computing hardware), a server in a cloud computing system, a device that includes computing hardware used in a cloud computing environment, or a similar type of device. The database 240 may communicate with one or more other devices of environment 200, as described elsewhere herein.

The client device 250 includes one or more devices capable of receiving, generating, storing, processing, and/or providing information associated with scanning and masking data at a source device, as described elsewhere herein. The client device 250 may include a communication device and/or a computing device. For example, the client device 250 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network 260 includes one or more wired and/or wireless networks. For example, the network 260 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 260 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
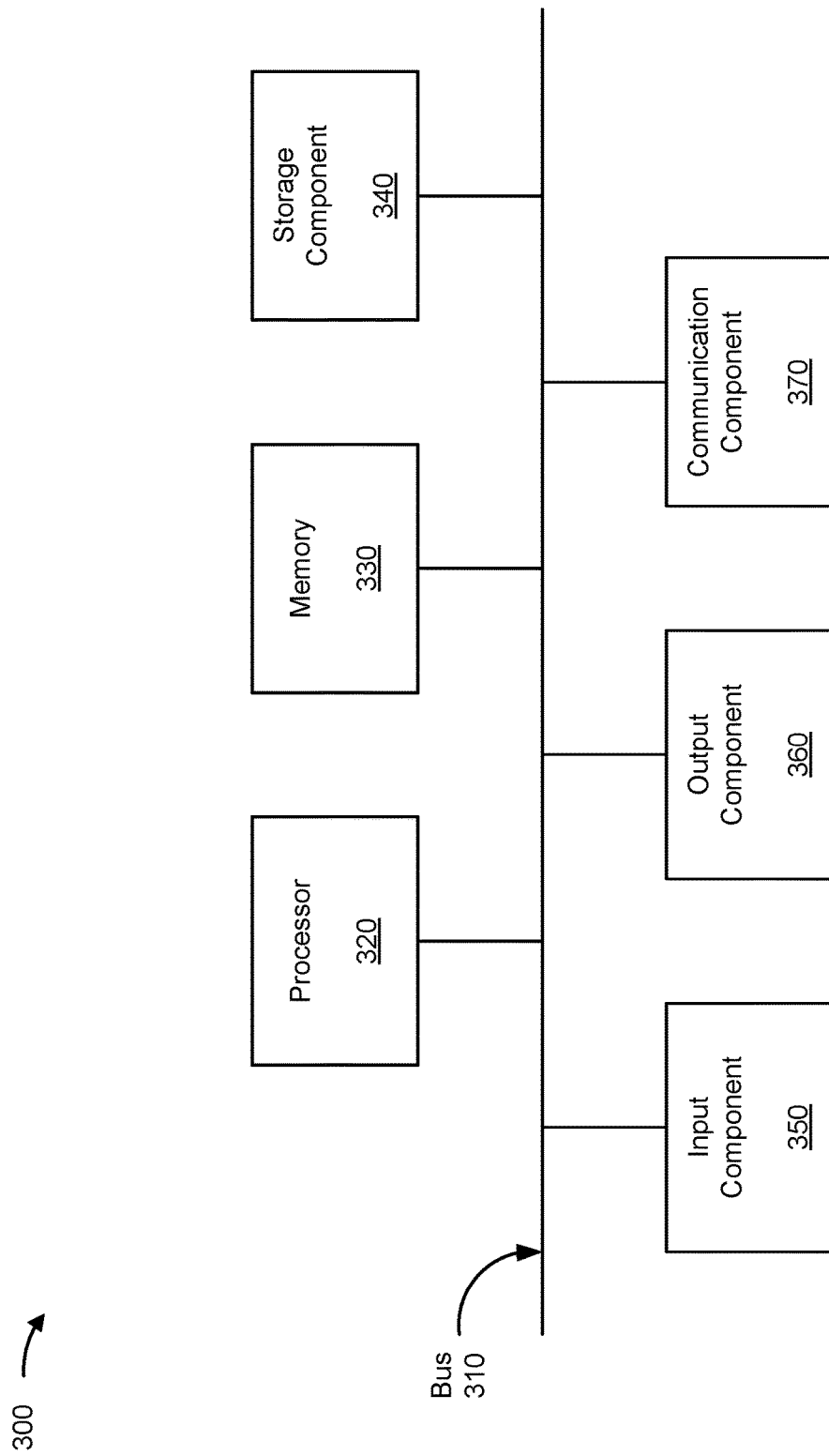
FIG. 3 is a diagram of example components of one or more devices of FIG. 2.

FIG. 3 is a diagram of example components of a device 300, which may correspond to the management server 210, the application server 220, the destination device 230, the database 240, and/or the client device 250, among other examples. In some implementations, the management server 210, the application server 220, the destination device 230, the database 240, and/or the client device 250 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
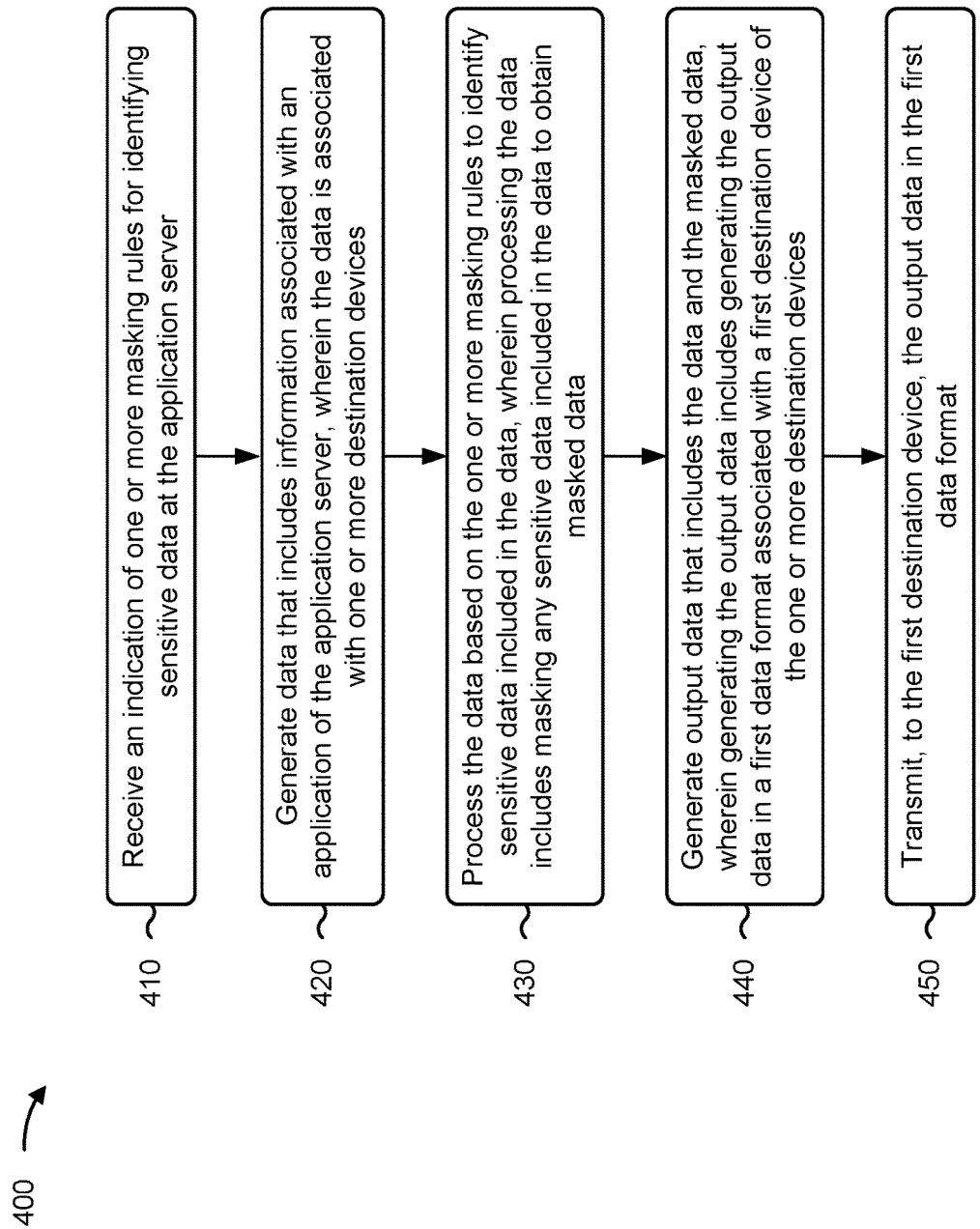
FIG. 4 is a flowchart of an example process relating to scanning and masking data at a source device.

FIG. 4 is a flowchart of an example process 400 associated with scanning and masking data at a source device. In some implementations, one or more process blocks of FIG. 4 may be performed by an application server (e.g., application server 220). In some implementations, one or more process blocks of FIG. 4 may be performed by another device or a group of devices separate from or including the application server, such as the management server 210, the destination device 230, the database 240, and/or the client device 250. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving an indication of one or more masking rules for identifying sensitive data at the application server (block 410). As further shown in FIG. 4, process 400 may include generating data that includes information associated with an application of the application server (block 420). In some implementations, the data is associated with one or more destination devices. As further shown in FIG. 4, process 400 may include processing the data based on the one or more masking rules to identify sensitive data included in the data (block 430). In some implementations, processing the data includes masking any sensitive data included in the data to obtain masked data. As further shown in FIG. 4, process 400 may include generating output data that includes the data and the masked data (block 440). In some implementations, generating the output data includes generating the output data in a first data format associated with a first destination device of the one or more destination devices. As further shown in FIG. 4, process 400 may include transmitting, to the first destination device, the output data in the first data format (block 450).

In some implementations, processing the data includes searching the data for sensitive data based on the one or more masking rules, wherein the one or more masking rules include one or more rules regular expression rules for searching data; identifying the sensitive data included in the data based on searching the data; and masking the sensitive data by replacing the sensitive data with a mask string. In some implementations, generating the output data includes generating output data that includes the data and the masked data in a second data format associated with a second destination device of the one or more destination devices; and transmitting, to the second destination device, the output data in the second data format.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The foregoing disclosure provides illustration and description, but is not intended to be exhaustive or to limit the implementations to the precise forms disclosed. Modifications may be made in light of the above disclosure or may be acquired from practice of the implementations. Accordingly, the scope of the invention should be determined not by the embodiments illustrated, but by the appended claims and their equivalents.

What is claimed is:

1. A source device for scanning and masking data at the source device, the source device comprising:
  one or more memories; and
  one or more processors, communicatively coupled to the one or more memories, configured to:
    receive, from a management server, a masking configuration that indicates one or more code modules for scanning log data for sensitive information,
      wherein each of the one or more code modules identify code that enables the source device to intercept data that is to be transmitted to a first destination device of one or more destination devices,
      wherein each of the one or more code modules enable the source device to scan the data for the sensitive information and to mask identified sensitive information to generate masked data,
      wherein each of the one or more code modules generate a corresponding different masked data, each of the corresponding different masked data being configured in a corresponding different format unique to the corresponding different masked data wherein the each of the one or more code modules correspond to only one or more destination devices, and
      wherein each of the one or more code modules correspond to a different one of the one or more destination devices in accordance with a corresponding security level selected from a plurality of security levels determined for the each of the one or more destination devices;
    generate the log data that includes information associated with an application of the source device;
    scan the log data for the sensitive information based on the one or more code modules, wherein scanning the log data enables the source device to identify the sensitive information included in the log data;
    modify the log data to remove the sensitive information from the log data and to generate first masked log data if the sensitive information is identified in the log data based on scanning the log data, wherein modifying the log data includes replacing the sensitive information in the log data with a mask string;
    transmit, to the first destination device of the one or more destination devices, the first masked log data, wherein transmitting the first masked log data includes transmitting the first masked log data in a first data format associated with the first destination device; and transmit, to the management server, telemetry information that enables the management server to monitor use of the masking configuration,
  wherein the telemetry information further enables the management server to identify servers configured with the masking configuration, and
  wherein transmission of the telemetry information further enables a feedback loop of the telemetry information to be created that enables management of the usage of the masking configuration by multiple servers to enable the management server to verify that each of the multiple servers has a correct and intended masking configuration.

2. The source device of claim 1, wherein the masking configuration further indicates at least one of:
  one or more masking rules, or
  a reporting configuration associated with reporting instances of the identified sensitive information.

3. The source device of claim 1, wherein the one or more processors, when modifying the log data, are configured to:
  identify a location of the sensitive information in the log data; and
  mask the sensitive information in the log data by replacing the sensitive information with the mask string, wherein the mask string includes at least one of:
  one or more characters,
  one or more symbols, or
  one or more digits.

4. The source device of claim 1, wherein the one or more processors are further configured to:
  transmit, to the management server, an indication of at least one of:
    that an instance of identified sensitive information has occurred,
    the log data,
    the first masked log data,
    the application associated with the log data, or
    an identifier associated with the source device.

5. The source device of claim 1, wherein the one or more processors are further configured to:
  identify a second destination device of the one or more destination devices;
  process log data associated with the second destination device based on the one or more code modules to generate second masked log data in a second data format that is associated with the second destination device; and
  transmit, to the second destination device, the second masked log data in the second data format.

6. The source device of claim 5, wherein the one or more processors are further configured to:
  identify, based on the masking configuration, a first code module associated with the first destination device and a second code module associated with the second destination device;
  execute the first code module to enable the source device to process log data associated with the first destination device; and
  execute the second code module to enable the source device to process the log data associated with the second destination device.

7. The source device of claim 1, wherein the telemetry information includes at least one of:
  a version associated with the masking configuration,
  an indication of one or more masking rules, or
  an identifier associated with the source device.

8. The source device of claim 1, wherein the one or more processors are further configured to:
  analyze, using a machine learning technique, the log data to identify at least one of:
    the sensitive information, or
    one or more patterns associated with the log data.

9. A method of scanning and masking data at an application server, comprising:
  receiving, by the application server and from a management server, a masking configuration including an indication of one or more code modules for identifying sensitive data at the application server,
    wherein each of the one or more code modules identify code that enables the application server to intercept data that is to be transmitted to a first destination device of one or more destination devices,
    wherein each of the one or more code modules enable the application server to scan the data for the sensitive data and to mask identified sensitive data to generate masked data,
    wherein each of the one or more code modules generate a corresponding different masked data, each of the corresponding different masked data being configured in a corresponding different format unique to the corresponding different masked data wherein the each of the one or more code modules correspond to only one or more destination devices, and
    wherein each of the one or more code modules correspond to a different one of the one or more destination devices in accordance with a corresponding security level selected from a plurality of security levels determined for the each of the one or more destination devices;
  generating, by the application server, data that includes information associated with an application of the application server;
  processing, by the application server, the data based on the one or more code modules to identify the sensitive data included in the data, wherein processing the data includes masking the sensitive data included in the data to obtain masked data;
  generating, by the application server, output data that includes the data and the masked data,
    wherein generating the output data includes generating the output data in a first data format associated with the first destination device of the one or more destination devices;
  transmitting, by the application server and to the first destination device, the output data in the first data format; and
  transmitting, by the application server and to the management server, telemetry information that enables the management server to monitor use of the masking configuration,
    wherein the telemetry information further enables the management server to identify servers configured with the masking configuration, and
    wherein transmission of the telemetry information further enables a feedback loop of the telemetry information to be created that enables management of the usage of the masking configuration by multiple servers to enable the management server to verify that each of the multiple servers has a correct and intended masking configuration.

10. The method of claim 9, wherein processing the data comprises:

searching the data for the sensitive data based on one or more masking rules, wherein the one or more masking rules include one or more regular expression rules for searching data;
identifying the sensitive data included in the data based on searching the data; and
masking the sensitive data by replacing the sensitive data with a mask string.

11. The method of claim 9, wherein the masking configuration indicates at least one of:
one or more masking rules, or
a reporting configuration associated with reporting instances of identified sensitive data to the management server.

12. The method of claim 9, further comprising:
identifying, based on processing the data, the sensitive data included in the data; and
transmitting an indication of the sensitive data to at least one of:
the management server, wherein the management server is associated with the application server and one or more other application servers, or
a device associated with a user of the application server.

13. The method of claim 9, wherein generating the output data comprises:
generating output data that includes the data and the masked data in a second data format associated with a second destination device of the one or more destination devices; and
transmitting, to the second destination device, the output data in the second data format.

14. The method of claim 9, further comprising:
identifying a first data collection application associated with the application server and a second data collection application associated with the application server;
identifying a first set of code associated with the first data collection application and a second set of code associated with the second data collection application, wherein the first set of code enables the application server to process data associated with the first data collection application and the second set of code enables the application server to process data associated with the second data collection application, and wherein the first data collection application is associated with the first destination device and the second data collection application is associated with a second destination device;
executing the first set of code and the second set of code;
transmitting, to the first destination device, first output data in the first data format based on executing the first set of code; and
transmitting, to the second destination device, second output data in a second data format based on executing the second set of code.

15. The method of claim 9, wherein the telemetry information includes at least one of:
a version associated with a masking configuration applied by the application server,
an indication of one or more masking rules, or
an identifier associated with the application server.

16. A non-transitory computer-readable medium storing a set of instructions, the set of instructions comprising:
one or more instructions that, when executed by one or more processors of a source device, cause the source device to:
receive, from a management server, a masking configuration that indicates one or more sets of code for scanning log data for sensitive information,
wherein each of the one or more sets of code identify code that enables the source device to intercept data that is to be transmitted to a first destination device of one or more destination devices,
wherein each of the one or more sets of code enable the source device to scan the data for the sensitive information and to mask identified sensitive information to generate masked data,
wherein each of the one or more sets of code generate a corresponding different masked data, each of the corresponding different masked data being configured in a corresponding different format unique to the corresponding different masked data wherein the each of the one or more code modules correspond to only one or more destination devices, and
wherein each of the one or more sets of code correspond to a different one of the one or more destination devices in accordance with a corresponding security level selected from a plurality of security levels determined for the each of the one or more destination devices;
generate the log data that includes information associated with an application of the source device;
scan the log data for the sensitive information based on the one or more sets of code, wherein scanning the log data enables the source device to identify the sensitive information included in the log data;
modify the log data to remove the sensitive information from the log data and to generate first masked log data if the sensitive information is identified in the log data based on scanning the log data, wherein modifying the log data includes replacing the sensitive information in the log data with a mask string;
transmit, to the first destination device of the one or more destination devices, the first masked log data, wherein transmitting the first masked log data includes transmitting the first masked log data in a first data format associated with the first destination device; and
transmit, to the management server, telemetry information that enables the management server to monitor use of the masking configuration,
wherein the telemetry information further enables the management server to identify servers configured with the masking configuration, and
wherein transmission of the telemetry information further enables a feedback loop of the telemetry information to be created that enables management of the usage of the masking configuration by multiple servers to enable the management server to verify that each of the multiple servers has a correct and intended masking configuration.

17. The non-transitory computer-readable medium of claim 16, wherein the masking configuration indicates at least one of:
one or more masking rules, or
a reporting configuration associated with reporting instances of identified sensitive information.

18. The non-transitory computer-readable medium of claim 16, wherein the one or more instructions, that cause the source device to modify the log data, further cause the source device to:

identify a location of the sensitive information in the log data; and mask the sensitive information in the log data by replacing the sensitive information with the mask string, wherein the mask string includes at least one of:
one or more characters,
one or more symbols, or
one or more digits.

19. The non-transitory computer-readable medium of claim 16, wherein the one or more instructions further cause the source device to:
identify a second destination device of the one or more destination devices;
process log data associated with the second destination device based on the one or more sets of code to generate second masked log data in a second data format that is associated with the second destination device; and
transmit, to the second destination device, the second masked log data in the second data format.

20. The non-transitory computer-readable medium of claim 16, wherein the telemetry information includes at least one of:
a version associated with the masking configuration,
an indication of one or more masking rules, or
an identifier associated with the source device.

* * * * *